US010922476B1

(12) United States Patent
Li et al.

(10) Patent No.: US 10,922,476 B1
(45) Date of Patent: Feb. 16, 2021

(54) RESOURCE-EFFICIENT GENERATION OF VISUAL LAYOUT INFORMATION ASSOCIATED WITH NETWORK-ACCESSIBLE DOCUMENTS

(71) Applicant: Microsoft Technology Licensing, LLC, Redmond, WA (US)

(72) Inventors: Ziliu Li, Sammamish, WA (US); Junaid Ahmed, Bellevue, WA (US); Arnold Overwijk, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/713,555

(22) Filed: Dec. 13, 2019

(51) Int. Cl.
*G06F 40/143* (2020.01)
*G06F 16/957* (2019.01)
*G06F 40/154* (2020.01)
*G06F 16/9035* (2019.01)
*G06F 16/958* (2019.01)

(52) U.S. Cl.
CPC ........ *G06F 40/143* (2020.01); *G06F 16/9035* (2019.01); *G06F 16/9577* (2019.01); *G06F 16/986* (2019.01); *G06F 40/154* (2020.01)

(58) Field of Classification Search
None
See application file for complete search history.

(56) References Cited

U.S. PATENT DOCUMENTS

| 7,207,000 B1 * | 4/2007 | Shen ..................... G06F 40/154 715/207 |
| 8,510,378 B2 * | 8/2013 | Colton ..................... G06F 8/30 709/203 |
| 8,719,451 B1 * | 5/2014 | Colton .................. G06F 16/958 709/248 |
| 8,752,183 B1 * | 6/2014 | Heiderich ............. G06F 21/577 726/25 |

(Continued)

OTHER PUBLICATIONS

Seddon, Ryan, "Ryan Seddon: So how does the browser actually render a website | JSConf EU 2015," available at https://www.youtube.com/watch?v=SmE4OwHztCc, frame of a YouTube Video at 3:15, accessed on Dec. 23, 2019, video posted Oct. 17, 2015, 1 page.

(Continued)

*Primary Examiner* — Justin S Lee

(57) ABSTRACT

A technique is described herein that receives a set of markup-language documents (e.g., HTML documents). The technique produces a set of object-model representations (VDOMs) based on the set of markup-language documents. For a given markup-language document, the producing operation involves accessing and processing information that is linked to the markup-language document. Each object-model representation also includes visual layout information that specifies a visual appearance of a page that would be produced upon display of the markup-language document by a browser application. The technique then generates transformation logic based on the set of markup-language documents and their corresponding VDOMs. The (Continued)

transformation logic, when applied to a new markup-language document, converts the new markup-language document into a corresponding VDOM without retrieving at least some information identified by links (if any) in the new markup-language document.

20 Claims, 9 Drawing Sheets

(56) References Cited

U.S. PATENT DOCUMENTS

| | | | | |
|---|---|---|---|---|
| 8,954,989 | B1* | 2/2015 | Colton | H04L 67/02 |
| | | | | 719/313 |
| 8,977,653 | B1* | 3/2015 | Mahkovec | G06F 16/957 |
| | | | | 707/802 |
| 9,053,177 | B1* | 6/2015 | Seo | G06F 16/951 |
| 9,122,650 | B1* | 9/2015 | Colton | G06F 16/986 |
| 9,405,745 | B2* | 8/2016 | Dendi | G06F 40/58 |
| 9,582,600 | B1* | 2/2017 | Killian | G06F 40/154 |
| 9,645,983 | B1* | 5/2017 | Tuan | G06F 16/957 |
| 9,699,142 | B1* | 7/2017 | Allen | G06F 21/563 |
| 9,892,205 | B2* | 2/2018 | Leece | G06F 16/9577 |
| 10,057,320 | B2* | 8/2018 | Taylor | H04L 67/2861 |
| 10,417,317 | B2* | 9/2019 | Myers | H04L 67/02 |
| 10,567,346 | B2* | 2/2020 | Joglekar | H04L 63/20 |
| 2002/0184264 | A1* | 12/2002 | Berg | G06F 16/84 |
| | | | | 715/205 |
| 2003/0041077 | A1* | 2/2003 | Davis | G06F 40/117 |
| | | | | 715/205 |
| 2004/0034831 | A1* | 2/2004 | Grober | G06F 40/169 |
| | | | | 715/234 |
| 2004/0103373 | A1* | 5/2004 | Wei | H04L 67/142 |
| | | | | 715/234 |
| 2004/0133595 | A1* | 7/2004 | Black | G06F 40/166 |
| 2006/0167929 | A1* | 7/2006 | Chakraborty | G06F 40/226 |
| 2007/0180364 | A1* | 8/2007 | Kobayashi | G06F 40/103 |
| | | | | 715/210 |
| 2007/0198919 | A1* | 8/2007 | Clarke | G06F 16/86 |
| | | | | 715/234 |
| 2007/0226612 | A1* | 9/2007 | Sun | G06F 16/9577 |
| | | | | 715/210 |
| 2008/0134019 | A1* | 6/2008 | Wake | G06F 40/154 |
| | | | | 715/239 |
| 2008/0300850 | A1* | 12/2008 | Chen | G06F 8/427 |
| | | | | 703/22 |
| 2013/0246906 | A1* | 9/2013 | Hamon | G06F 16/9577 |
| | | | | 715/234 |
| 2014/0047318 | A1* | 2/2014 | Glazkov | G06F 9/451 |
| | | | | 715/234 |
| 2014/0101539 | A1* | 4/2014 | Ma | G06F 40/14 |
| | | | | 715/235 |
| 2014/0201113 | A1* | 7/2014 | Harz | G06N 20/00 |
| | | | | 706/12 |
| 2014/0344673 | A1* | 11/2014 | Kutty | G09B 5/06 |
| | | | | 715/236 |
| 2015/0242373 | A1* | 8/2015 | Xue | G06F 40/106 |
| | | | | 715/234 |
| 2015/0244728 | A1* | 8/2015 | Tao | G06F 16/9574 |
| | | | | 726/23 |
| 2015/0363505 | A1* | 12/2015 | Dewa | H04L 65/60 |
| | | | | 715/234 |
| 2016/0162569 | A1* | 6/2016 | Erle | G06F 40/137 |
| | | | | 707/739 |
| 2016/0364369 | A1* | 12/2016 | Zhou | G06F 40/14 |
| 2020/0081927 | A1* | 3/2020 | Sabbavarpu | G06F 16/9577 |

OTHER PUBLICATIONS

Abdelmogoud, Mustafa, "How the browser renders HTML & CSS," available at https://medium.com/@mustafa.abdelmogoud/how-the-browser-renders-html-css-27920d8ccaa6, Medium, May 20, 2018, 10 pages.

Grigorik, Ilya, "Render-tree Construction, Layout, and Paint," available at https://developers.google.com/web/fundamentals/performance/critical-rendering-path/render-tree-construction, Web Fundamentals, Google Developers, Google Inc., Mountain View, CA, 6 pages.

Li, Ziliu, "Scalable and Resource-Efficient Extraction of Data from Network-Accessible Documents," U.S. Appl. No. 16/713,515, filed Dec. 13, 2019, 57 pages.

* cited by examiner

OVERVIEW OF TRANSFORMATION-LOGIC-GENERATING PROCESS
902

RECEIVE A SET OF MARKUP-LANGUAGE DOCUMENTS THAT ORIGINATE FROM A REPOSITORY OF NETWORK-ACCESSIBLE DOCUMENTS, A NUMBER OF DOCUMENTS IN THE SET OF MARKUP-LANGUAGE DOCUMENTS BEING LESS THAT A TOTAL NUMBER OF NETWORK-ACCESSIBLE DOCUMENTS IN THE REPOSITORY.
904

STORE THE SET OF MARKUP-LANGUAGE DOCUMENTS IN A SAMPLE DATA STORE.
906

PRODUCE A SET OF OBJECT-MODEL REPRESENTATIONS FOR A PLURALITY OF MARKUP-LANGUAGE DOCUMENTS IN THE SET OF MARKUP-LANGUAGE DOCUMENTS. THE PRODUCING OPERATION INCLUDES, FOR A GIVEN MARKUP-LANGUAGE DOCUMENT, ACCESSING INFORMATION THAT IS LINKED TO THE MARKUP-LANGUAGE DOCUMENT BY AT LEAST ONE LINK, IF ANY, SPECIFIED IN THE GIVEN MARKUP-LANGUAGE DOCUMENT. AN OBJECT-MODEL REPRESENTATION ASSOCIATED WITH THE GIVEN MARKUP-LANGUAGE DOCUMENT INCLUDES VISUAL LAYOUT INFORMATION THAT SPECIFIES A VISUAL APPEARANCE OF A PAGE THAT IS PRODUCIBLE UPON DISPLAY OF THE GIVEN MARKUP-LANGUAGE DOCUMENT BY A BROWSER APPLICATION.
908

STORE THE SET OF OBJECT-MODEL REPRESENTATIONS IN AN OBJECT-REPRESENTATION DATA STORE.
910

CONTINUED FROM FIG. 9

GENERATE TRANSFORMATION LOGIC BASED ON THE SET OF MARKUP-LANGUAGE DOCUMENTS AND THE SET OF OBJECT-MODEL REPRESENTATIONS. THE TRANSFORMATION LOGIC IS CONFIGURED TO, WHEN APPLIED TO NEW MARKUP-LANGUAGE DOCUMENTS, CONVERT THE NEW MARKUP-LANGUAGE DOCUMENTS INTO RESPECTIVE NEW OBJECT-MODEL REPRESENTATIONS WITHOUT RETRIEVING AT LEAST SOME INFORMATION IDENTIFIED BY LINKS IN THE NEW MARKUP-LANGUAGE DOCUMENTS.
1002

STORE THE TRANSFORMATION LOGIC IN A MODEL DATA STORE.
1004

FIG. 10

OVERVIEW OF TRANSFORMATION-LOGIC-APPLICATION PROCESS
1102

RECEIVE A NEW MARKUP-LANGUAGE DOCUMENT FROM A REPOSITORY OF NETWORK-ACCESSIBLE MARKUP-LANGUAGE DOCUMENTS.
1104

USE TRANSFORMATION LOGIC TO CONVERT THE NEW MARKUP-LANGUAGE DOCUMENT INTO A CORRESPONDING NEW OBJECT-MODEL REPRESENTATION WITHOUT RETRIEVING AT LEAST SOME INFORMATION IDENTIFIED BY AT LEAST ONE LINK, IF ANY, CONTAINED IN THE NEW MARKUP-LANGUAGE DOCUMENT.
1106

STORE THE NEW OBJECT-MODEL REPRESENTATION.
1108

RESOURCE-EFFICIENT GENERATION OF VISUAL LAYOUT INFORMATION ASSOCIATED WITH NETWORK-ACCESSIBLE DOCUMENTS

BACKGROUND

A developer or other individual may wish to analyze network-accessible documents (e.g., Internet-accessible web pages) for various purposes. For example, the developer may wish to extract data from the documents, and/or examine the visual features associated with the documents once rendered by a browser application. However, this task is resource-intensive and time-intensive in nature, which may prevent the developer from performing analysis on a large number of documents.

SUMMARY

A computer-implemented technique is described herein for processing network-accessible documents in a resource-efficient manner. In a sampling operation, the technique receives a set of markup-language documents (e.g., HTML documents). The technique then produces a set of object-model representations based on the set of markup-language documents. For a given markup-language document, the producing operation involves accessing information that is linked to the markup-language document by activating at least one link (if any) specified in the markup-language document, and accessing linked information obtained therefrom. Each object-model representation also includes visual layout information that specifies a visual appearance of the markup-language document that would be produced by a browser application upon display of the markup-language document. For this reason, each object-model representation is referred to as a Visual Document Object Model (VDOM) herein.

The technique then generates transformation logic based on the set of markup-language documents and their corresponding VDOMs. The transformation logic, when applied to a new markup-language document, converts the new markup-language document into a corresponding VDOM without retrieving at least some information identified by links (if any) in the new markup-language document.

The technique consumes computer resources in a resource-efficient manner because it allows a consuming application to capture information regarding a markup-language document without performing the resource-intensive and time-intensive task of activating links in the markup-language document, retrieving linked information accessible via the links, and then processing that linked information. The technique accomplishes this result because the transformation logic already embodies knowledge that would be gained by activating the links and processing linked information, without actually activating those links.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 9 and 10 together show an overview of a transformation-logic-generating process performed by the computing environment of FIG. 1.

FIG. 11 shows an overview of a transformation-logic-application process performed by the computing environment of FIG. 1.

Figure 1:
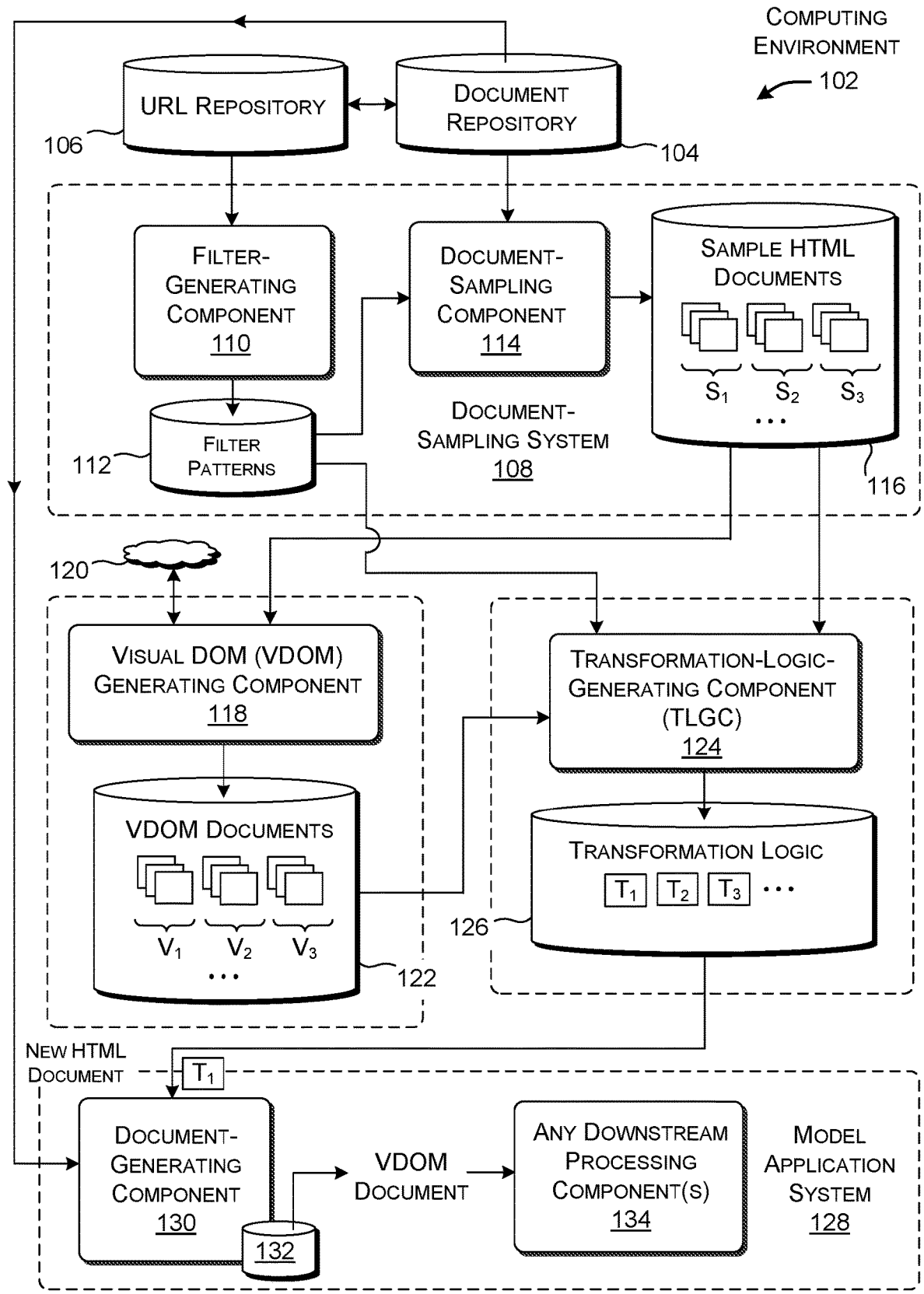
FIG. 1 shows an illustrative computing environment for processing network-accessible documents.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing environment for processing network-accessible documents. Section B sets forth illustrative methods that explain the operation of the computing environment of Section A. And Section C describes an illustrative kind of computing device that can be used to implement any aspect of the features described in Sections A and B.

As a preliminary matter, the term "hardware logic circuitry" corresponds to a processing mechanism that includes one or more hardware processors (e.g., CPUs, GPUs, etc.) that execute machine-readable instructions stored in a memory, and/or one or more other hardware logic units (e.g., FPGAs) that perform operations using a task-specific set of fixed and/or programmable logic gates. Section C provides additional information regarding one implementation of the hardware logic circuitry. In some contexts, each of the terms "component," "engine," and "tool" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic units that include a task-specific set of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical element that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Unless otherwise noted, the descriptors "first," "second," "third," etc. are used to distinguish among different items, and do not imply an ordering among items. Finally, the terms "exemplary" or "illustrative" refer to one implementation among potentially many implementations.

A. Illustrative Computing Environment

FIG. 1 shows an illustrative computing environment 102 for processing network-accessible documents. In one implementation, the network-accessible documents correspond to web pages accessible via a wide area network, such as the Internet. In one implementation, the web pages are expressed in a markup language, such as the HyperText Markup Language (HTML). Other implementations can apply the principles described herein with respect to other kinds documents (e.g., other than, or in addition to, HTML documents).

FIG. 1 shows a document repository 104 for storing the network-accessible documents. In one implementation, the document repository 104 generally represents the distributed resources provided by the Internet. Alternatively, or in addition, the document repository 104 may represent one or more central data stores that provide a collection of network-accessible documents that have been previously harvested from other sources.

FIG. 1 shows another repository 106 for storing identifiers associated with the network-accessible documents. In one implementation, the identifiers correspond to Uniform Resource Locators (URLs) associated with the network-accessible documents, and the URL repository 106 itself corresponds to an index provided at a single location or distributed over two or more locations. Other implementations can apply the principles described herein with respect to other types of identifiers (e.g., other than, or in addition to, URLs). Alternatively, or in addition, other implementations can include a single repository for storing both URLs and the documents associated therewith.

A document-sampling system 108 produces plural sets ($S_1$, $S_2$, $S_3$, . . . ) of markup-language documents selected from the document repository 104, to be processed by downstream components of the computing environment 102. The document-sampling system 108 includes a filter-generating component 110 which produces plural filter patterns for use in subsequently extracting markup-language documents from the document repository 104. For example, assume that a developer wishes to extract markup-language documents from plural top-level domains, one of which is a movie-related database associated with the top-level domain "MovieArchive.com." The filter-generating component 110 can provide a first filter pattern "MovieArchive.com/*" that matches all pages associated with the top-level domain "MovieArchieve.com," where the symbol "*" is a wildcard character that designates any information in a URL that follows the prefix information "MovieArchive.com/." The filter-generating component 110 can generate a second filter pattern "MovieArchive.com/title/*" that matches all pages in a subdomain that includes pages devoted to different movie titles, and so on. Again, the symbol "*" designates any information in a URL that follows the prefix information "MovieArchive.com/title/." In one non-limiting implementation, the filter-generating component 110 can express each filter pattern as a regular expression (regex).

More generally, the filter-generating component 110 can generate the filter patterns by sequencing through different top-level domains identified in the URL repository 106 (the top-level domain "MovieArchive.com" being one such domain). Or the filter-generating component 110 can sequence through only certain types of top-level domains that are of interest.

The filter-generating component 110 can also optionally generate one or more filter patterns associated with respective subdomains of a website. More specifically, a website (associated with a top-level domain) can be conceptualized as a data structure that organizes its various domains as a hierarchical tree, where each domain includes one or more pages associated therewith. The filter-generating component 110 generates filter patterns that target different nodes of this tree data structure, which are associated with different domains. For instance, the filter-generating component 110 can generate a first filter pattern associated with the root of the tree data structure, plural filter patterns associated with child nodes that directly depend from the root node, and so on. The filter-generating component 110 can then store the filter patterns in a filter data store 112, e.g., as respective regular expressions.

A document-sampling component 114 uses each filter pattern to extract a set of network-accessible documents in the document repository 104 that match the filter pattern. For example, assume that the document repository has two million web pages that match the filter pattern "MovieArchive.com/*." The document-sampling component 114 can use this filter pattern to randomly select three hundred of these documents. These are merely illustrative values; more generally, in many cases, the document-sampling component 114 can be said to extract a number p of markup-language documents from the document repository 104 that match a particular filter pattern, where the document repository 104 contains a total number q of documents that match the filter pattern, and where p<<q.

The document-sampling component 114 stores plural sets ($S_1, S_2, S_3, \ldots$) of markup-language documents in a sample data store 116. Each set of markup-language documents is associated with a particular class of documents that matches a particular filter pattern. In some cases, two sets of markup-language documents associated with a same top-level domain contain entirely distinct subsets of pages. In other cases, a first set of markup-language documents from a top-level domain is entirely subsumed by another set of markup-language documents.

The sample data store 116 may represent a data store that is separate from the document repository 104. Alternatively, the sample data store 116 may store identifiers (e.g., URLs) associated with markup-language documents in the various sets ($S_1, S_2, S_3, \ldots$) of markup-language documents, but not the content of those markup-language documents themselves; in that case, the downstream components (described below) of the computing environment 102 can extract the content of the markup-language documents from the document repository 104.

In another implementation, the document-sampling system 108 collects a single set $S_1$ of documents from the document repository 104 without regard to the classes associated with the documents, and hence, without using the filter patterns in the filter data store 112. The downstream components of the computing environment 102 will leverage this single set of documents to generate a single instance of transformation logic that is applicable to all documents. However, to facilitate description, it will be henceforth assumed that the document-sampling system 108 produces at least two different sets ($S_1$, $S_2$) of markup-language documents, and that the downstream components generate an instance of transformation logic for each set.

A generating component 118 next produces object-model representations associated with the markup-language documents in the sample data store 116, to overall produce plural sets ($V_1, V_2, V_3$) of object-model representations. The following explanation will describe the process of converting a single markup-language document (referred to below as the "given markup-language document") to an object-model representation. The generating component 118 performs this same operation with respect to each markup-language document in each set.

Consider, for instance, a representative markup-language document associated with a page of the website MovieArchive.com. Assume that this markup-language document has plural hyperlinks. In normal use, a client-side browser application (not shown) would activate these links in the course of rendering the page associated with the markup-language document. For example, the given markup-language document will typically include one or more links to Cascading Style Sheet (CSS) information. The CSS information governs various aspects of the visual appearance of the page. For instance, the CSS information may specify the font used to display a paragraph of text. In addition, or alternatively, the given markup-language document may include one or more links to script-related information. To cite merely one example, the script-related information may correspond to JAVASCRIPT code that plays a role in rendering the page and/or in handling an end-user's interaction with the page. In addition, or alternatively, the given markup-language document may include one or more links to advertisements and/or other supplemental content. The browser application may present the advertisements and/or other supplemental content together with a principal content of the page, e.g., by presenting the supplemental content in a margin region of the page, etc. These examples of linked content are described here in the spirit of illustration, not limitation; the given markup-language document can retrieve any other kind(s) of linked information.

As a first step, the generating component 118 accesses all of the linked information specified in the given markup-language. It performs this task by activating each link in the page, if any. A link specifies the URL associated with a source from which the linked information can be obtained. The generating component 118 then retrieves the linked information from the identified source. In some cases, although not necessarily all cases, the source corresponds to a data source that is accessible via a computer network 120, such as the Internet.

Next, the generating component 118 constructs an object-model representation of the given markup-language document. It performs this task based on information contained in the given markup-language document and any linked information retrieved from the identified (linked) source(s). Generally speaking, the object-model representation identifies the features of the page that would be produced by a browser application for the given markup-language document. It also conveys the visual appearance of those features, had the browser application displayed the page. As will be clarified below, however, the computing environment 102 need not actually display the page to generate the object-model representation. Henceforth, the object-model representation of a given markup-language document is referred to as a Visual Document Object Model (VDOM) because it specifically incorporates visual layout information. Further, the generating component 118 is henceforth referred to as a VDOM-generating component.

In one implementation, the VDOM-generating component 118 can express the VDOM as a tree data structure that has a collection of nodes. The tree data structure includes some nodes that express the elements specified in the static markup-language document. Further, in one implementation, the VDOM-generating component 118 can arrange these nodes in generally the same hierarchical manner that is specified by the given markup-language document (although this need not be true in all cases). The VDOM-generating component 118 can then supplement the above-identified nodes with additional nodes that specifically describe the visual layout of the page.

For example, consider the case in which a given markup-language document contains markup content that specifies a paragraph presented in a text box, where that paragraph provides a textual description of a movie. The VDOM for this markup-language document can include one or more nodes that identify this feature as a text box containing a paragraph, and which specify the text associated with the paragraph. The VDOM can also include one or more other nodes that describe the visual properties of the text box, such as the placement of this text box on a page, the style of the font of the text in the paragraph, the size of the font, the color of the text, and so on. This set of nodes is set forth here in the spirit of illustration, not limitation; in other implementations, the VDOM for this markup-language document can specify other visual properties of a page that would be presented by a browser application.

Note that the purpose of the computing environment 102 is not necessarily to literally render a page on a display screen based on the VDOM (although this is possible too). Rather, the computing environment 102 produces a VDOM that describes the visual layout of a page that could be generated on the basis of the markup-language document. As described below, a downstream application can leverage the VDOM to perform any task(s) without actually rendering a page associated with the VDOM. In this context, the purpose of the VDOM-generating component 118 is to generate information that is useful for whatever task is performed by a consuming downstream application component. Further note that the VDOM is not (or at least need not be) the same as a render tree that a conventional browser application produces in the course of displaying a markup-language document. In at least some cases, for instance, the VDOM can provide a richer description of the visual layout of a page compared to a browser application's render tree.

The VDOM-generating component 118 can harvest visual layout information from various sources. For instance, the VDOM-generating component 118 can extract at least some of the visual layout information from the sources that it interrogates, based on the links contained the markup-language document. The VDOM-generating component 118 can also consult a browser layout engine (not shown) or a simulation thereof to identify the position at which different features specified in the markup-language document will appear on a page, if that page was displayed by a browser application.

The VDOM-generating component 118 stores one or more sets of VDOMs ($V_1, V_2, V_3, \ldots$) in an object-representation data store 122. The VDOMs in a set $V_1$ of VDOMs are VDOM-counterparts of the markup-language documents in a set $S_1$ of markup-language documents.

A transformation-logic-generating component (TLGC) 124 next converts each set $V_1$ of VDOMs into an instance of transformation logic $T_1$. When applied, the transformation logic operates to convert a new markup-language document into a corresponding VDOM without activating the links (if any) specified in the new markup-language document, or at least without activating at least some of the links. In other words, the transformation logic produces a VDOM without retrieving linked information identified by the new markup-language document. The transformation logic can perform this task because it contains logic which already embodies knowledge about how a markup-language document translates into VDOM information.

In one implementation, the TLGC 124 stores a plurality of instances of transformation logic ($T_1, T_2, T_3, \ldots$) in a model store 126. Each instance of transformation logic pertains to a particular class of documents, which, in turn, is associated with a particular filter pattern and a corresponding set $S_1$ of markup-language documents. In another implementation, the TLGC 124 produces plural instances of transformation logic, but fewer instances than the number of filter patterns in the filter data store 112. To perform this task, the TLGC 124 can produce at least one instance of transformation logic that is applicable to two or more filter patterns and the sets of markup-language documents associated therewith. For example, assume that the above-referenced top-level domain MovieArchive.com is a member of a family of websites related to media items (movies, songs, books, etc.). Further assume that the websites in this family display the same kinds of information about media items, and organize that information in generally the same manner. In that case, the TLGC 124 can generate a single instance of transformation logic that is applicable to the entire family of websites. The computing environment 102 can determine that two or more domains are related by consulting manually-specified website family information, and/or by using any tool to compare the degree of similarity between the pages produced by two or more websites, etc. One such optional automated tool can assess the similarity between two websites by using a machine trained Deep Neural Network (DNN) to map information regarding the pages hosted by the two websites into two respective vectors in a semantic space, and then computing the distance between the vectors (e.g., using a cosine similarity metric, etc.). In another implementation, the TLGC 124 can generate a single global instance of transformation logic that is applicable to all markup-language documents regardless of their respective classes.

A model application system 128 utilizes the instances of transformation logic provided in the model data store 126. More specifically, a document-generating component 130 receives a new markup-language document, such as a new HTML document. "New" in this context means that the markup-language document may not have been previously considered by the computing environment 102 in generating the various instances of transformation logic. As a first task, the document-generating component 130 attempts to find an instance of transformation logic that is appropriate for the particular kind of markup-language document that is under consideration. The document-generating component 130 performs this task using matching logic (not shown in FIG. 1). In one implementation, the matching logic operates by comparing a URL associated with a new markup-language document to various filter patterns. The data-generating component 130 then selects the instance of transformation logic that is associated with the matching filter pattern. Here, the selected instance is $T_1$. This assumes that each instance of transformation logic is associated in advance with a particular filter pattern.

More specifically, to perform its comparison function, the matching logic can consult a single data store that provides the filter patterns associated with the different instances of transformation logic. Or each instance of transformation logic can include a signature that reveals its own filter pattern. In the latter scenario, the matching logic can compare the URL associated with an incoming new document with the signature of each instance of transformation logic. The matching logic can be implemented as a subcomponent of the document-generating component 130, and/or as an "external" component that the document-generating component 130 consults.

In one implementation, the document-generating component 130 can use the same filter patterns as the document-sampling component 114, e.g., corresponding to the filter patterns in the filter data store 112. In another implementation, the document-generating component 130 can use different filter patterns compared to those used by the document-sampling component 114, e.g., by applying a single filter pattern that is associated with a family of related top-level domains.

As a second function, the document-generating component 130 can apply a selected instance of transformation logic to convert the new markup-language document into a VDOM. It performs this function without accessing at least some of the linked information identified in the new markup-language document. The document-generation component 130 can store each VDOM that it produces in a data store 132.

The model application system 128 can include yet other components 134 that can perform downstream operations based on the VDOMs generated by the document-generating component 130. For instance, the downstream processing components 134 can include a data-mining component that extracts data items from a plurality of VDOMs generated by the document-generating component 130. The data-mining operation can leverage the visual layout information specified in the VDOMs to more accurately pinpoint the location of the data items to be extracted (such as movie titles, movie directors, movie cast members, etc.). In one case, the data-mining component can apply a machine-trained model to perform this task, which is trained using a training dataset that includes a plurality of VDOMs having labels associated therewith (which identify kinds of data items in the VDOMs and their respective locations). Alternatively, or in addition, the data-mining component can use heuristic logic (e.g., heuristic rules, heuristic algorithms, etc.) to perform its data-mining function.

The computing environment 102 as a whole has various benefits. According to one benefit, the computing environment 102 can produce visual layout information associated with a domain without accessing, storing, and processing linked information specified by markup-language documents associated with this domain. This greatly expedites the task of analyzing network-accessible document. It also reduces the amount of computing resources (e.g., processing, memory, and communication resources) that are needed to analyze the network-accessible documents. It also eliminates or reduces the memory resources that would be used to store linked information in a cache. From a more encompassing standpoint, these advantages allow the computing environment 102 to process a large number of network-accessible documents in a resource-efficient and time-efficient manner. In other words, the above advantages contribute to the high scalability of the computing environment 102.

The above-noted potential advantages are cited by way of example, not limitation. The computing environment 102 can offer yet other benefits in particular contexts.

Figure 2:
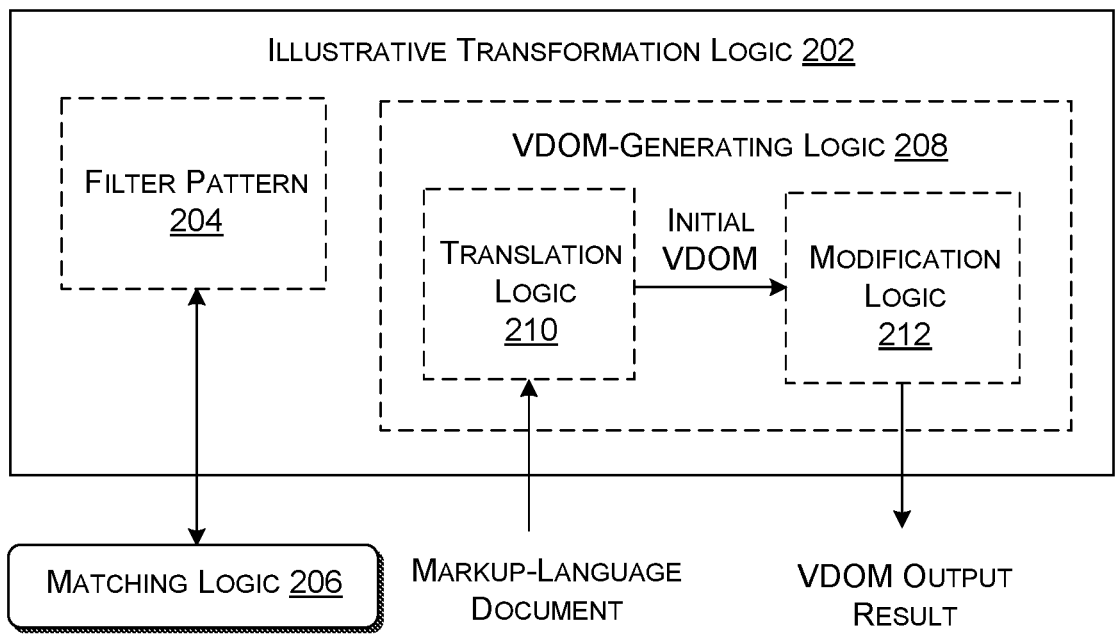
FIG. 2 shows an illustrative instance of transformation logic produced by the computing environment of FIG. 1.

FIG. 2 shows an illustrative instance of transformation logic 202 produced by the computing environment 102 of FIG. 1. In one implementation, the instance of transformation logic 202 includes at least two parts. A first part specifies a filter pattern 204 associated with the instance of transformation logic 202. Matching logic 206 determines whether the instance of transformation logic 202 matches a new markup-language document (e.g., a new HTML document) under consideration; it performs this task by determining whether the URL associated with the new markup-language document matches the filter pattern 204. In one implementation, the matching logic 206 corresponds to a component of the document-generating component 130 shown in FIG. 1.

A second part of the instance of transformation logic includes VDOM-generating logic 208. The VDOM-generating logic 208 converts an input markup-language document into a corresponding VDOM. In one implementation, the VDOM-generating logic 208 performs this transformation operation using translation logic 210 in optional conjunction with modification logic 212. The translation logic 210 translates the elements in the markup-language document into corresponding VDOM information. This operation yields an initial VDOM. The modification logic 212 then modifies the initial VDOM based on heuristic logic (e.g., heuristic rules, heuristic algorithms, etc.). For example, assume that the initial VDOM specifies a text box, corresponding to a text field in which a movie-related page displays a textual description of a movie. Assume that different movie-related pages include descriptions of different respective lengths, and therefore include text boxes having different respective sizes to accommodate the descriptions. The modification logic 212 can apply heuristic logic that adjusts a default height of the text box in the initial VDOM based on the number of words in the textual description, as conveyed by the text content specified in the input markup-language document.

In one implementation, the translation logic 210 performs its task using a machine-trained model (e.g., using a sequence-to-sequence machine-trained model, a transformer, etc.). The modification logic 212 can perform its task using handcrafted heuristic logic. But, more generally, any part of the VDOM-generating logic 208 can apply any kind of technique(s) to perform its translation and modification functions. Further, in another approach, the VDOM-generating logic 208 includes a single engine (e.g., a single machine-trained model) to perform both the above-described translation and modification functions.

Figure 3:
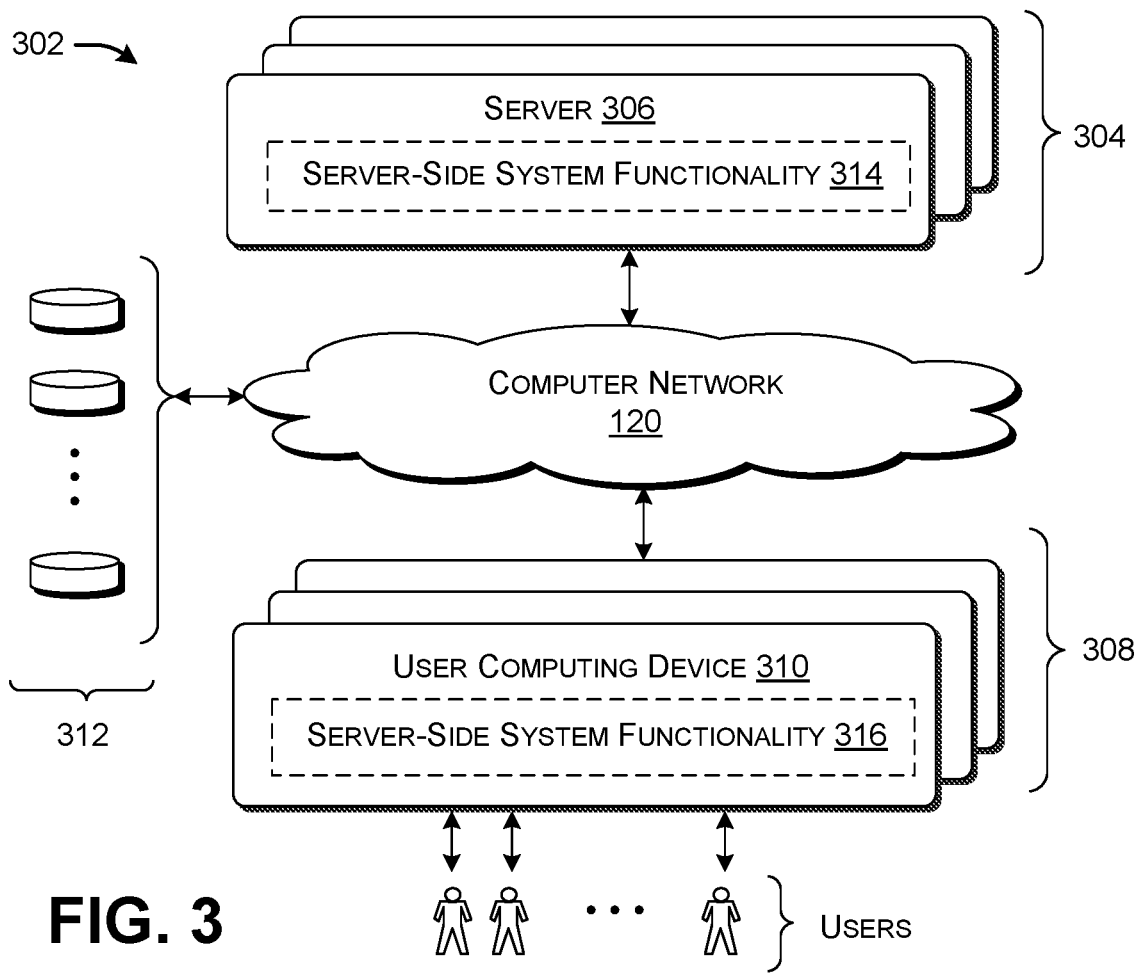
FIG. 3 shows computing equipment that can be used to implement aspects of the computing environment of FIG. 1.

FIG. 3 shows computing equipment 302 that can be used to implement aspects of the computing environment 102 of FIG. 1. The computing equipment 302 includes a plurality of servers 304 (including a representative server 306) coupled to a plurality of user computing devices 308 (including a representative user computing device 310) via the computer network 120. The user computing devices 308 can include any types of computing devices, including desktop personal computing devices, laptop computing devices, any type of handheld computing devices (e.g., smartphones, tablet-type computing devices, etc.), game consoles, mixed-reality devices, wearable devices, Internet-of-Thing (IoT) devices, and so on, or any combination of thereof. The computer network 120 can correspond to any type of local area network, any type of wide area network (e.g., the Internet), etc., or any combination thereof. The computer network 120 also provides access to any number of data stores 312. These data stores 312 may represent the distributed data repository provided by the Internet and/or one or more centralized data stores that provide documents harvested from other sources.

The functionality of the computing environment 102 can be distributed among the devices shown in FIG. 3 in any manner. FIG. 3 illustrates this point by showing that any server can include any system functionality (e.g., system functionality 314 provided by the representative server 306), and by showing that any user computing device can likewise include any system functionality (e.g., system functionality 316 provided by the representative user computing device 310). Each instance of the system functionality can implement any aspect(s) of the operations performed by the computing environment 102. For instance, in one implementation, the servers 304 can implement all aspects of the computing environment 102 described above. In another implementation, each local user computing device can implement all aspects of the computing environment 102. In still another implementation, the servers 304 and the user computing devices 308 can cooperatively implement the functions of the computing environment 102 in distributed fashion. For instance, the servers 304 can implement the document-sampling system 108, the VDOM-generating component 118, and the TLGC 124, while each user computing device can implement its own local instantiation of the document-generating component 130. Still other implementations are possible.

Figure 4:
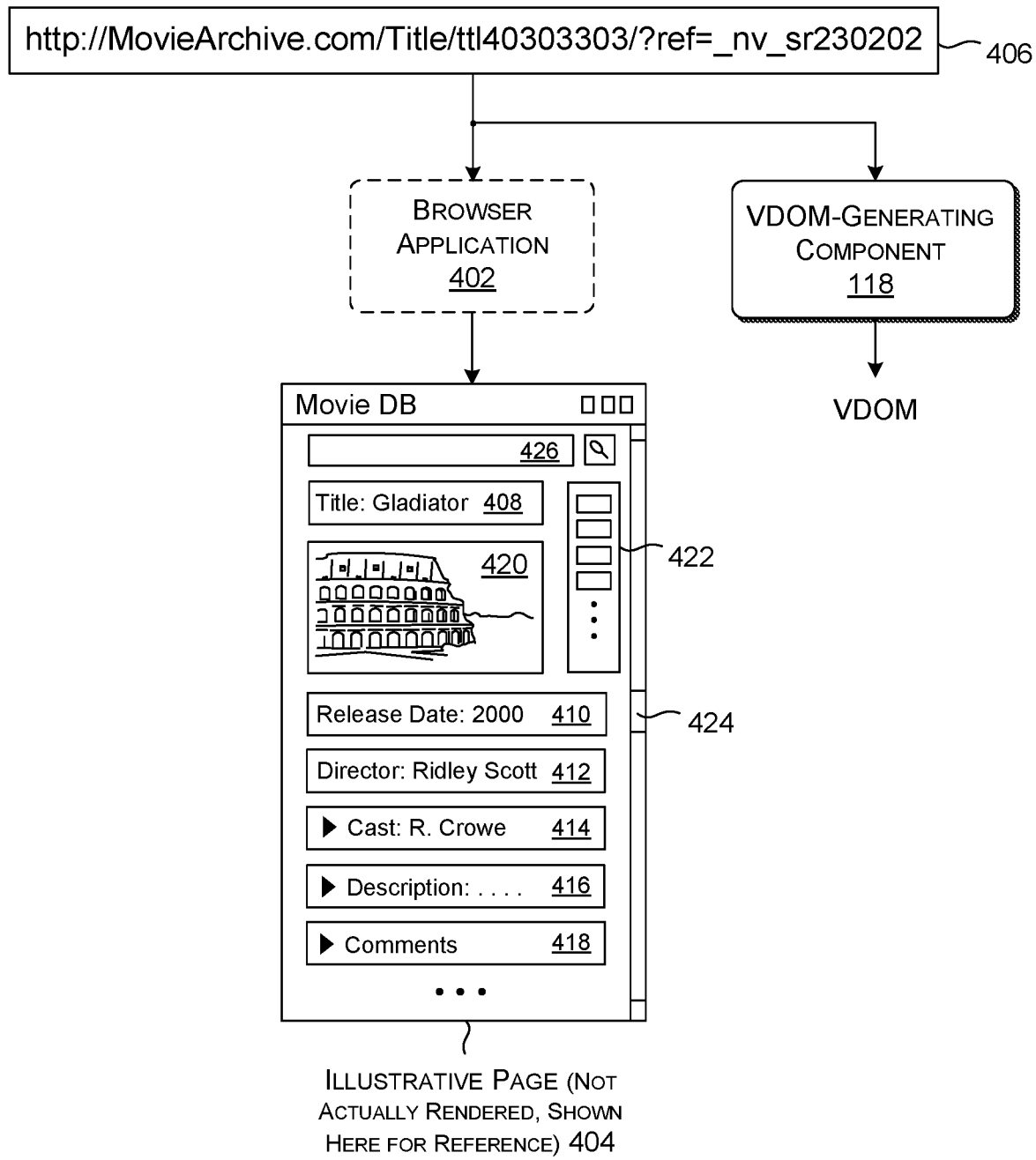
FIG. 4 shows an illustrative page that a browser application would display upon accessing a particular URL.
Figure 5:
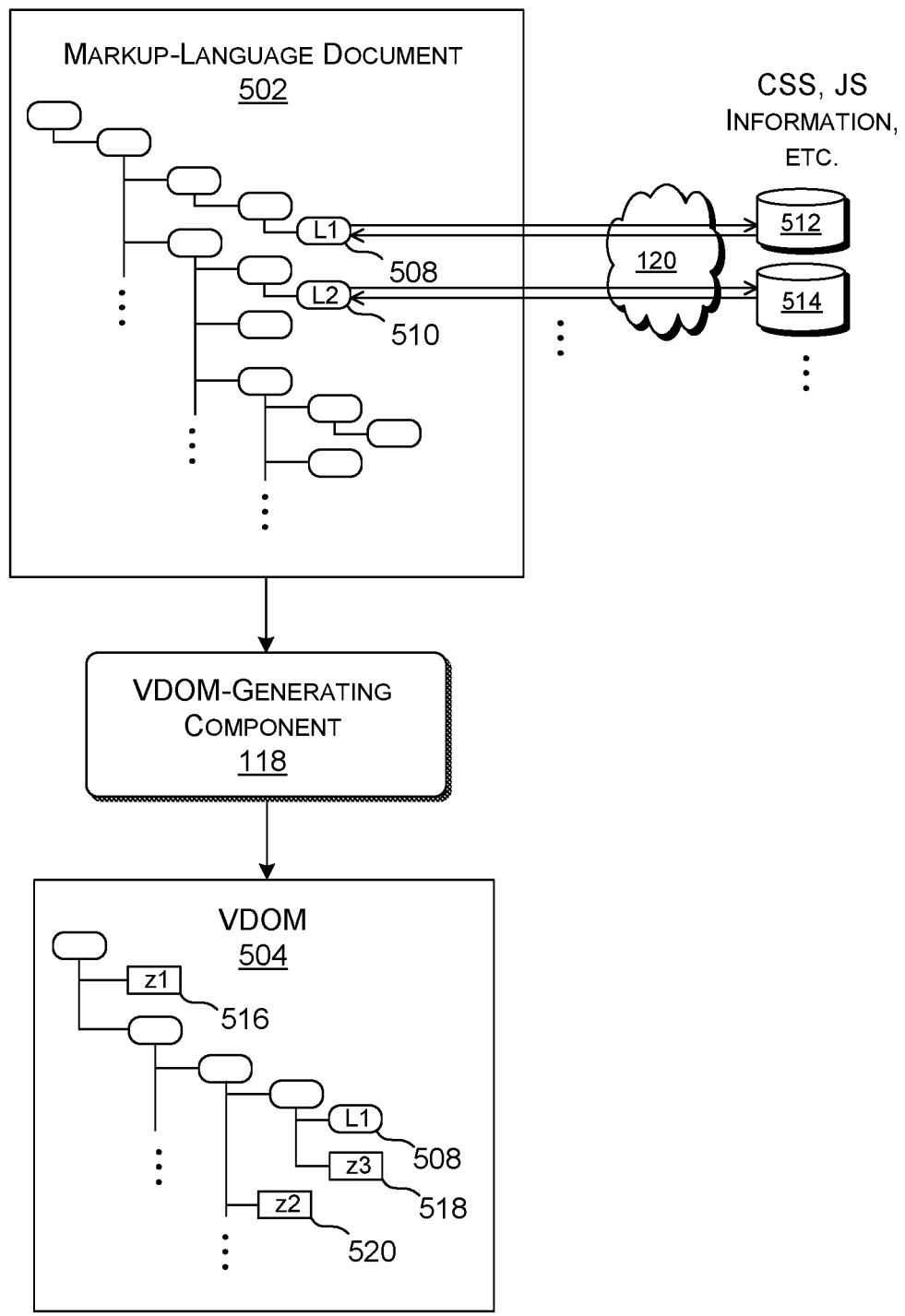
FIG. 5 shows functionality by which the computing environment of FIG. 1 generates a Visual Document Object Model (VDOM).

FIGS. 4 and 5 depict an example by which the computing environment 102 converts a representative markup-language document into a corresponding VDOM. Starting with FIG. 4, this figure provides context for the explanation by showing how a browser application 402 might render a particular page 404 associated with an activated URL 406. The page 404 includes various parts, including various content-bearing sections that describe different fields of information regarding a particular movie. These content-bearing sections include, for instance, a title section 408, a release date section 410, a director section 412, a cast section 414, a description section 416, a comment section 418, and so on. The page 404 also includes at least one image 420. The page 404 also includes various user interface controls by which an end user may interact with the page, including a menu 422, a scroll bar 424, a search box 426, etc. Assume that all pages associated with this same domain have the same visual layout information. That is, all pages include the same content-bearing sections and user interface controls, laid out in the same manner shown in FIG. 4. It will be appreciated that the specific visual layout shown in FIG. 4 is presented merely for the purpose of illustration, not limitation; the computing environment 102 can operate on pages having any organization of features and user interface controls.

Further note that the VDOM-generating component 118 does not (or at least need not) actually render the page 404. Rather, as explained above, the VDOM-generating component 118 generates visual layout information in the form of a VDOM, which it stores in memory; the VDOM describes the visual layout of the page 404, but a browser application 402 does not (or at least need not) actually display it. FIG. 4 shows the actual visual layout of the page 404 only to facilitate the explanation of the VDOM-generating component 118.

FIG. 5 explains one way in which the VDOM-generating component 118 can convert a given markup-language document 502 to a VDOM 504. Assume that the markup-language document 502 corresponds to a (HyperText Markup Language) HTML document. In that case, the markup-language document 502 includes a plurality of elements arranged in a tree data structure. The markup-language document 502 uses tag-pairs to identify different types of elements, as in the example <p class="paragraph"> This movie features exciting combat in the Roman Coliseum.</p>. The information <p class="paragraph"> corresponds to a start tag associated with the element. Within the start tag, "class" is an attribute name, and "paragraph" is an attribute value. The text "This movie features exciting combat in the Roman Coliseum." corresponds to the content associated with the element, and </p> corresponds to an end tag associated with the element. The text "This movie features exciting combat in the Roman Coliseum." may also be considered a data item. A downstream data-mining component may extract data items such as this from the markup-language document 502.

FIG. 5 also indicates that the markup-language document includes at least two links (506, 508). The first link 506 may correspond to a URL that points to linked information provided in a remote data store 512, while the second link 510 may correspond to a URL that points to linked information provided in a remote data store 514. The linked information may correspond to Cascading Style Sheet (CSS) information, script information (e.g., JAVASCRIPT information), advertisements, and/or any other content. The VDOM-generating component 118 can retrieve the linked information via the computer network 120 by activating the links (508, 510).

As previously explained, the VDOM-generating component 118 can construct the VDOM 504 based on the elements in the markup-language document 502, the linked information retrieved from the data stores (512, 514), layout information provided by a layout engine (not shown), and so on. In one non-limiting implementation, the VDOM 504 also has a tree data structure that includes a plurality of nodes. Some of the nodes match or otherwise derive from elements in the original markup-language document 502. For example, one such node can describe text content provided in the description section 416 of FIG. 4. The organization of these nodes in the VDOM 504 can also match or otherwise derive from the organization of counterpart elements in the markup-language document 502. Other nodes in the VDOM 504 provide supplemental information that describes the visual layout of the various features of the page 404 (of FIG. 4). For example, one such node can describe the position of the description section 416 of FIG. 4 within a page. A layout engine can provide this position information, e.g., by providing coordinates that define the corners of a text box. Another node can describe the type of font used in the description section 416, and so on. Linked CSS information can provide this style-related information.

In one non-limiting implementation, VDOM-generating component 118 can "hang" a visual node off of a feature-related node identified by the markup-language document 502 to which it pertains. For example, the VDOM-generating component 118 can include a parent node that pertains to the description section 416 (shown in FIG. 4). The parent node can include a first child node that describes the text associated with this section, and one or more other child nodes that describe the visual properties of this section. In the merely illustrative example of FIG. 5, the VDOM 504 contains at least visual nodes (516, 518, 520). This is a small excerpt of an actual VDOM; an actual VDOM can be expected convey much more visual information regarding a page.

Figure 6:
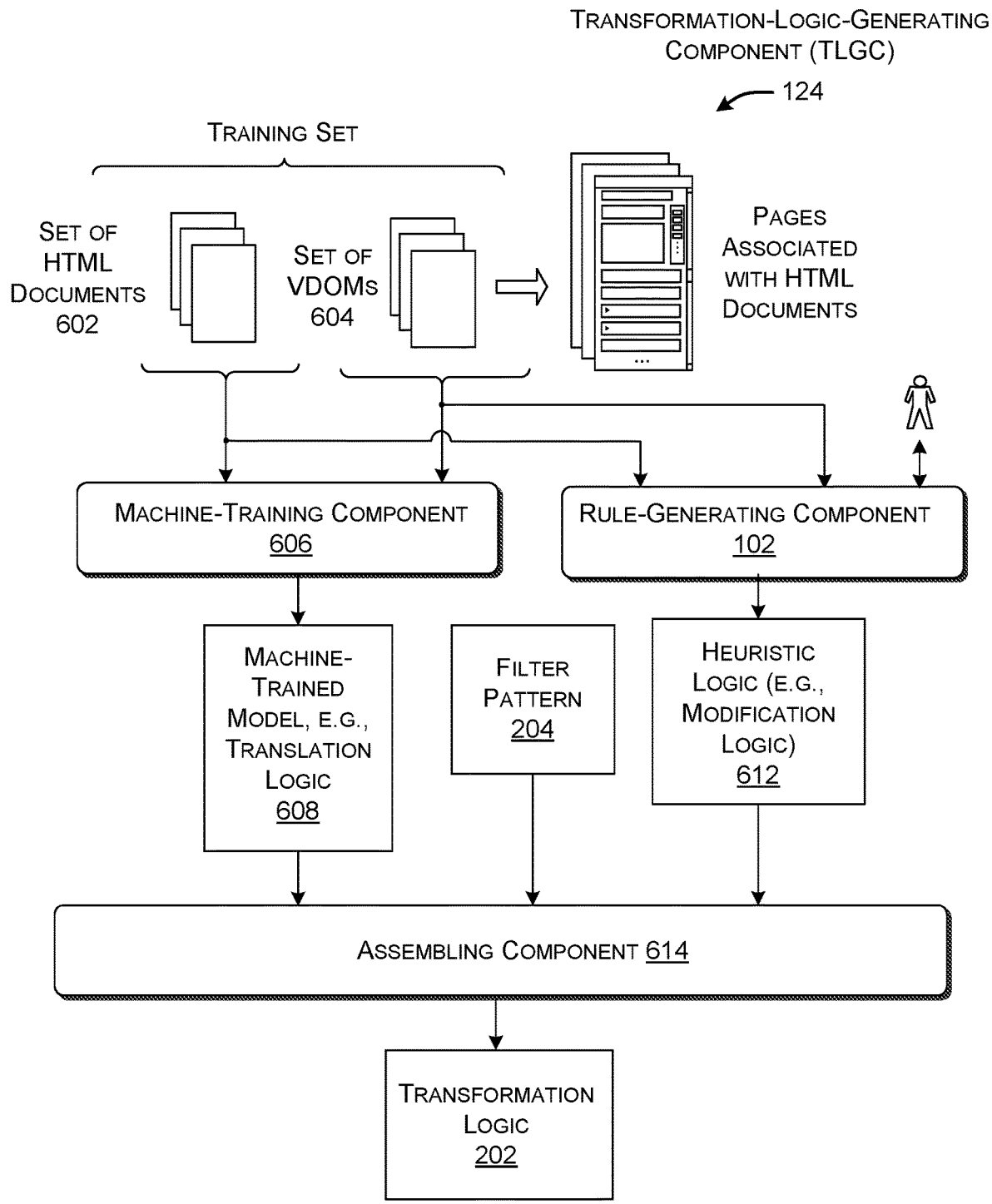
FIG. 6 shows functionality by which the computing environment of FIG. 1 generates an instance of transformation logic based on plural VDOMs.

FIG. 6 shows one illustrative implementation of the transformation-logic-generating component (TLGC) 124, introduced above in the explanation of FIG. 1. The TLGC component 124 receives input information in the form of at least a set 602 of markup-language documents and a set 604 of VDOMs associated therewith (as generated by the VDOM-generating component 118). For frame of reference, FIG. 6 also shows the pages that would be displayed by the browser 402 based on the corresponding markup-language documents. Generally, the purpose of the TLGC component 124 is to generate an instance of transformation logic 202 based on this input information. The instance of transformation logic 202, when applied to a new markup-language document, converts the new markup-language document into a VDOM without accessing at least some of the links (if any) in the new markup-language document. Although not shown, the TLGC 124 can perform this same function for a plurality of classes of markup-language documents, to produce a corresponding plurality of instances of transformation logic ($T_1, T_2, T_3, \ldots$).

In one implementation, the TLGC 124 includes both a machine-training component 606 for producing at least one machine-trained model 608 and a heuristic-logic-generating component 610 for producing heuristic logic 612. In one implementation, the machine-trained model 608 provides the translation logic 210 described with reference to FIG. 2. In the application phase, the translation logic 210 converts a new markup-language document into an initial VDOM. The heuristic logic 612 provide the modification logic 212 described with reference to FIG. 2. The modification logic 212 modifies the initial VDOM produced by the translation logic 210 based on one or more characteristics of the new markup-language document, as described in greater detail below.

More specifically, in the application phase, the machine-trained model 608 operates by processing a set of features that describe the elements of an input markup-language document. In one implementation, the machine-trained model 608 can process the elements of the markup-language on an element-by-element basis. For instance, the machine-trained model 608 can process each element in the markup-language document in sequence, starting with the root node of the document and advancing through its tree data structure from top to bottom, and processing the nodes in each row from left to right.

With respect to a particular element under consideration, the machine-trained model 608 can provide some features that describe the element itself. The machine-trained model 608 can generate other features that describe the elements that neighbor the element under consideration in the markup-language document, e.g., within an n-node window. The machine-trained model 608 can convert all of these features into a form that can be further processed, e.g., by converting these features into one-hot input vectors using a transformation table, etc. The machine-trained model 608 then uses one or more layers of machine-trained logic to transform the input vectors into an output result. The output result of the machine-trained model 608 for the element under consideration corresponds to one or more nodes in a VDOM. In whole, the machine-trained model 608 can be said to translate the elements of the markup-language document (which can be considered akin to a source language document) to the nodes of a corresponding VDOM (which can be considered akin to a target language document), without accessing at least some of the links in the markup-language document.

Without limitation, the machine-trained model 608 may correspond to a neural network of any type(s). For instance, the machine-trained model 608 can include a sequence-to-sequence machine-trained model. The sequence-to-sequence model includes an encoder for converting input features that describe a markup-language document into an intermediate representation. The sequence-to-sequence model includes a decoder for then converting the intermediate representation into the VDOM. When visualized in "rolled-out" fashion, the sequence-to-sequence machine-trained model includes a pipeline of processing units. Each processing unit of the pipeline can be implemented using a Long-Short-Term-Memory (LSTM) unit. Each LSTM unit feeds a hidden state vector that it generates to a next LSTM unit in the sequence (e.g., in the forward direction of flow), and/or receives a hidden state vector from a succeeding LSTM unit (e.g., in the backward direction of flow). The use of a sequence-to-sequence model is merely illustrative. In another implementation, the machine-trained model 608 can be implemented as a transformer, a Hidden Markov Model, a generative model of type, etc.

The machine-trained model 608 can optionally employ one or more layers that implement a machine-trained attention mechanism. An attention mechanism selectively adjusts the weights applied to values in a particular layer of the machine-trained model 608 based on respective degrees to which the values play a role in influencing the output result of the machine-trained model 608. By adjusting the values in this manner, the attention mechanism ultimately emphasizes some input features over other input features.

The machine-training component 606 can generate the machine-trained model 608, whatever form it takes, by iteratively operating on a training set that includes the set 602 of markup-language documents and the corresponding set 604 of VDOMs. In doing so, the machine-training component 606 can attempt to maximize the number of correct translations and/or minimize the number of incorrect translations. A correct translation corresponds to a translation of HTML information to VDOM information that is considered correct. The machine-training component 606 can use any technique to achieve this objective, such as stochastic gradient descent. In another approach, the machine-training component 606 can produce a generative machine-trained model that attempts to generate an accurate VDOM, given an input markup-language document. In one approach, the machine-training component 606 can produce this generative model using, for instance, a Conditional Generative Adversarial Network (CGAN).

In one implementation, a human developer manually interacts with the heuristic-logic-generating component 610 to produce handcrafted heuristic logic, which can take any form or combination of forms (e.g., IF-THEN rules, mathematical transformation functions, heuristic algorithms, etc.). In another implementation, the heuristic-logic-generating component 610 can wholly or at least partially automate the generation of the heuristic logic. For example, the heuristic-logic-generating component 610 can include an association rule learning engine that automatically generates the heuristic logic 612 (e.g., using the a-priori technique).

An assembling component 614 assembles the different parts of each instance of transformation logic 202. These parts include the translation logic 210 (e.g., as implemented by the machine-trained model 608), the modification logic 212 (e.g., as implemented by the heuristic logic 612), and optionally the filter pattern 204. As described, the filter pattern 204 identifies the class of markup-language documents to which the transformation logic 202 can be applied.

Figure 7:
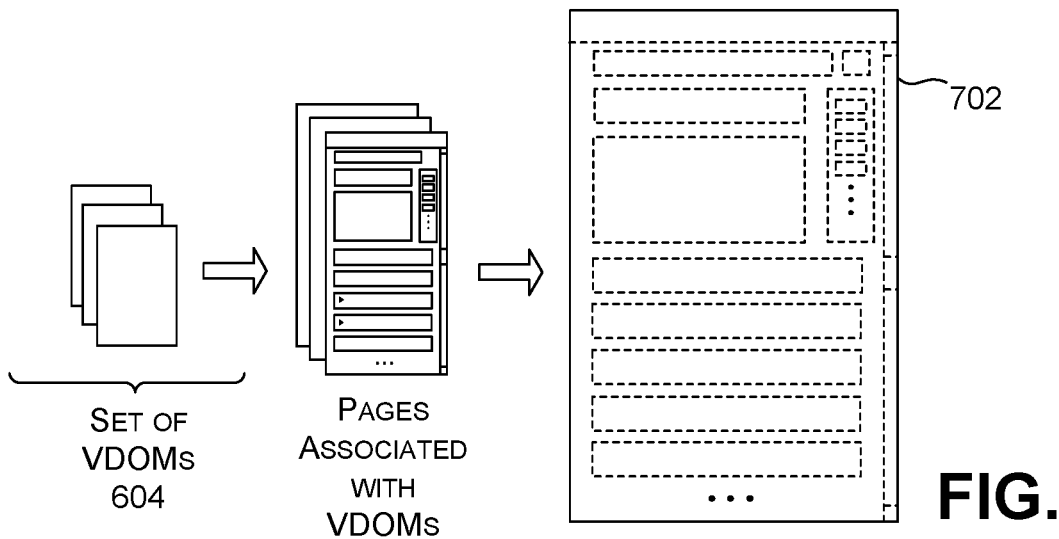
FIG. 7 depicts, in high-level form, how an instance of transformation logic embodies visual layout information expressed by plural VDOMs, from which the transformation logic is generated.

FIG. 7 depicts knowledge that is inherently expressed in the machine-trained model 608, which the machine-training component 606 captures from the set 604 of input VDOMs. As shown, the machine-training component 606 can be expected to learn a template 702 that expresses the most prevalent patterns exhibited in pages that would be produced by a browser application, given the input set 602 of markup-language documents. That is, the template 702 specifies what display features are prevalently found in the pages, as well as the arrangement of those features. Note that FIG. 7 is a high-level conceptualization of the knowledge embodied by the knowledge embodied by the machine-trained model 608, which is inherently expressed by its learned weighting and bias values; the machine-trained model 608 does not, or at least need not, literally store a template in the visual form shown in FIG. 7. Further note that the template 702 can omit textual and image content that varies among different markup-language documents. But in some implementations, the template 702 can also embody information regarding textual and image content that remains the same across a set of markup-language documents (such as textual header information, logo information, etc.).

Figure 8:
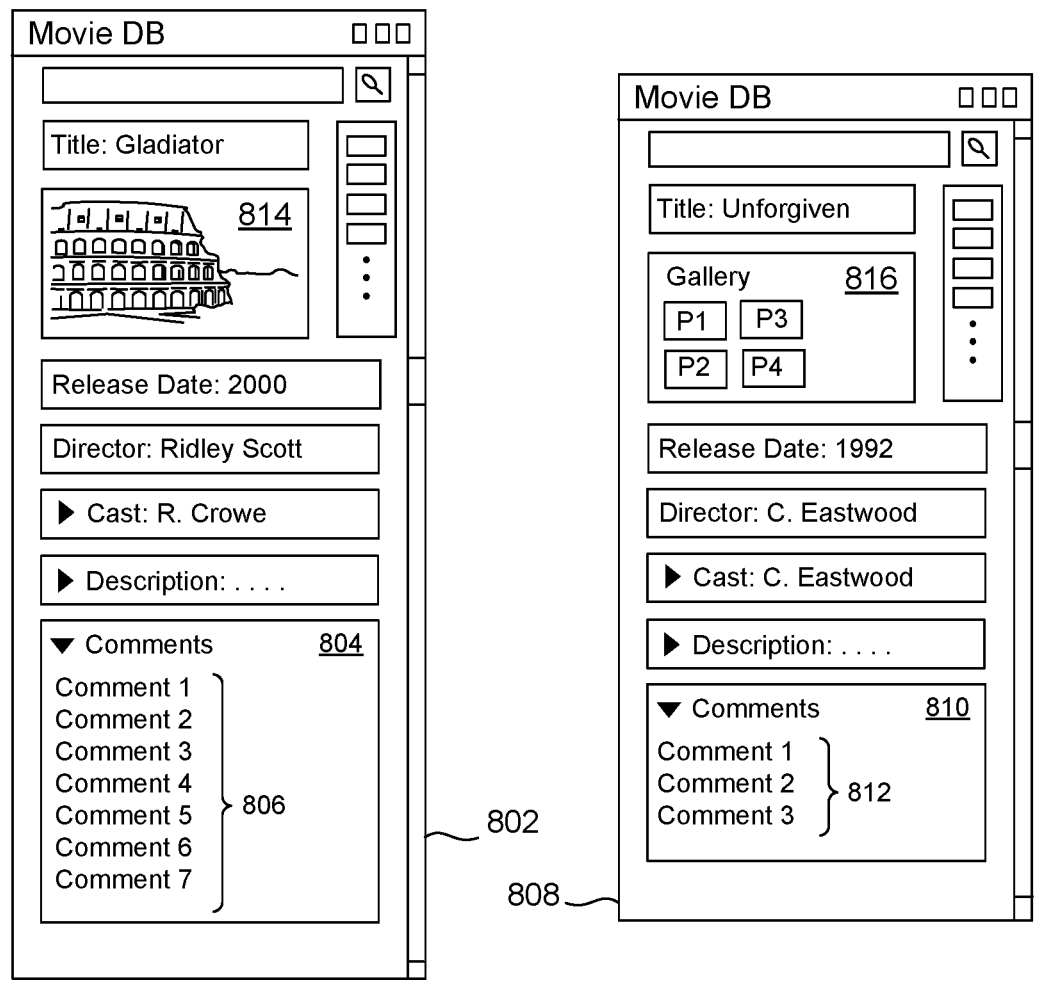
FIG. 8 is an example that will be used to explain the optional role of heuristic logic (e.g., one or more heuristic rules, one or more heuristic algorithms, etc.) that are optionally provided by the transformation logic.

FIG. 8 shows a scenario in which a developer may choose to add heuristic logic to the modification logic 212. This scenario shows a first movie-related page 802 having a comment section 804 with at least seven comments 806. It shows a second movie-related page 808 taken from the same domain that has a comment section 810 with at least three comments 812. The developer may fashion logic that specifies that a height of the comment section should be proportional to the number of comments in the markup-document. The modification logic 212 can execute this logic by changing a default height of a text box (specified in an initial VDOM) to a height that depends on the number of comments detected in the markup-language document.

Further note that the first page 802 includes a single image 814, while the second page 808 includes an image section 816 having at least four thumbnail images (P1, P2, P3, P4), together with a legend having the word "gallery." The developer may fashion logic that generates a first kind of VDOM if it determines that the markup-language makes reference to a single image, and a second kind of VDOM if it determines that the corresponding markup-language document makes reference to plural thumbnail images, and/or if the markup-language document includes the keyword "gallery." These different kinds of VDOMs capture different respective ways that the two pages (802, 808) convey image information.

These two examples are described above in the spirit of illustration, not limitation. A human developer or automated engine can provide yet other logic to account for expected variations from the general template 702 shown in FIG. 7. In other words, a developer or automated engine can fashion any logic that modifies an initial VDOM based on one or more factors, such as inclusion or omission of features in a page, the sizes of those features, the organization of those features, the behavior of those features, and so on.

B. Illustrative Processes

FIGS. 9-11 show processes (902, 1102) that explain the operation of the computing environment 102 of Section A in flowchart form. Since the principles underlying the operation of the computing environment 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIGS. 9 and 10 together show an overview of a transformation-logic-generating process 902 performed by the computing environment 102 of FIG. 1. In block 904, the document-sampling component 114 receives a set $S_1$ of markup-language documents that originate from a repository 104 of network-accessible documents. A documents in the set $S_1$ of markup-language documents is less that a total number of network-accessible documents in the repository 104. In block 906, the document-sampling component 114 stores the set $S_1$ of markup-language documents in a sample data store 116. In block 908, the VDOM-generating component 118 produces a set $V_1$ of object-model representations (VDOM) for a plurality of markup-language documents in the set $S_1$ of markup-language documents.

The operation of producing includes, for a given markup-language document, accessing information that is linked to the markup-language document by at least one link, if any, specified in the given markup-language document. An object-model representation associated with the given markup-language document includes visual layout information that specifies a visual appearance of a page that is producible upon display of the given markup-language document by a browser application. In block 910, the VDOM-generating component 118 stores the set $V_1$ of object-model representations in an object-representation data store 122.

Advancing to FIG. 10, in block 1002, the transformation-logic-generating component (TLGC) 124 next generates transformation logic 202 based on the set $S_1$ of markup-language documents and the set $V_1$ of object-model representations. The transformation logic 202 is configured to, when applied to new markup-language documents, convert the new markup-language documents into respective new object-model representations without retrieving at least some information identified by links in the new markup-language documents. In block 1004, the TLGC 124 stores the transformation logic 202 in a model data store 126.

FIG. 11 shows an overview of a transformation-logic-application process 1102 performed by the computing environment 102 of FIG. 1. In bock 1104, the document-generating component 130 receives a new markup-language document from the repository 104 of network-accessible markup-language documents. In block 1106, the document-generating component 130 uses the transformation logic 202 to convert the new markup-language document into a corresponding new object-model representation (VDOM) without retrieving at least some information identified by at least one link, if any, contained in the new markup-language document. In block 1108, the document-generating component 130 stores the new object-model representation in a data store 132.

C. Representative Computing Device

Figure 12:
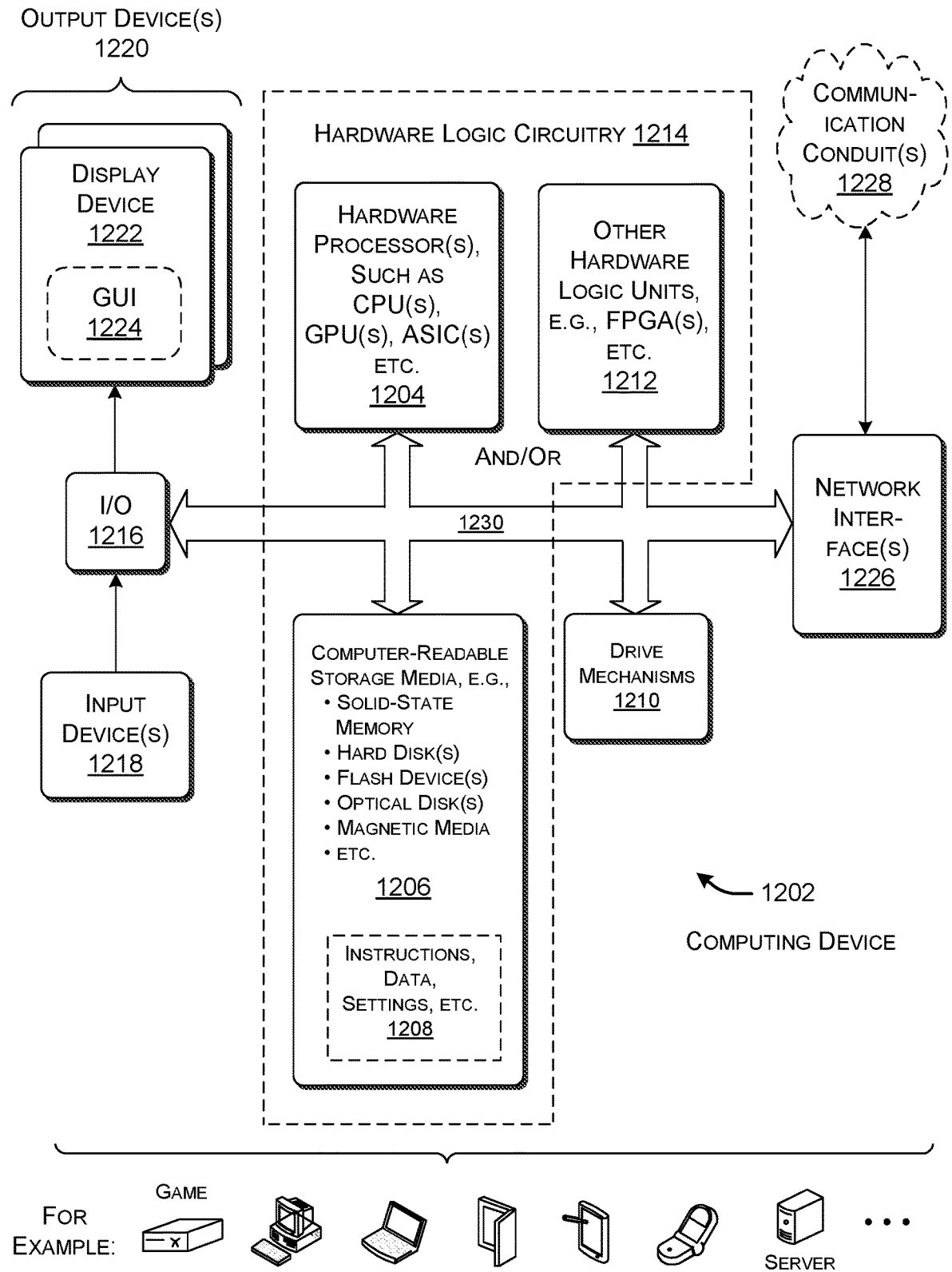
FIG. 12 shows an illustrative type of computing device that can be used to implement any aspect of the features shown in the foregoing drawings.

FIG. 12 shows a computing device 1202 that can be used to implement any aspect of the mechanisms set forth in the above-described figures. For instance, with reference to FIG. 3, the type of computing device 1202 shown in FIG. 12 can be used to implement any server, any user computing device, etc. In all cases, the computing device 1202 represents a physical and tangible processing mechanism.

The computing device 1202 can include one or more hardware processors 1204. The hardware processor(s) 1204 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1202 can also include computer-readable storage media 1206, corresponding to one or more computer-readable media hardware units. The computer-readable storage media 1206 retains any kind of information 1208, such as machine-readable instructions, settings, data, etc. Without limitation, for instance, the computer-readable storage media 1206 may include one or more solid-state devices, one or more magnetic hard disks, one or more optical disks, magnetic tape, and so on. Any instance of the computer-readable storage media 1206 can use any technology for storing and retrieving information. Further, any instance of the computer-readable storage media 1206 may represent a fixed or removable unit of the computing device 1202. Further, any instance of the computer-readable storage media 1206 may provide volatile or non-volatile retention of information.

The computing device 1202 can utilize any instance of the computer-readable storage media 1206 in different ways. For example, any instance of the computer-readable storage media 1206 may represent a hardware memory unit (such as Random Access Memory (RAM)) for storing transient information during execution of a program by the computing device 1202, and/or a hardware storage unit (such as a hard disk) for retaining/archiving information on a more permanent basis. In the latter case, the computing device 1202 also includes one or more drive mechanisms 1210 (such as a hard drive mechanism) for storing and retrieving information from an instance of the computer-readable storage media 1206.

The computing device 1202 may perform any of the functions described above when the hardware processor(s) 1204 carry out computer-readable instructions stored in any instance of the computer-readable storage media 1206. For instance, the computing device 1202 may carry out computer-readable instructions to perform each block of the processes described in Section B.

Alternatively, or in addition, the computing device 1202 may rely on one or more other hardware logic units 1212 to perform operations using a task-specific set of logic gates. For instance, the hardware logic unit(s) 1212 may include a fixed configuration of hardware logic gates, e.g., that are created and set at the time of manufacture, and thereafter unalterable. Alternatively, or in addition, the other hardware logic unit(s) 1212 may include a set of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 12 generally indicates that hardware logic circuitry 1214 includes any combination of the hardware processor(s) 1204, the computer-readable storage media 1206, and/or the other hardware logic unit(s) 1212. That is, the computing device 1202 can employ any combination of the hardware processor(s) 1204 that execute machine-readable instructions provided in the computer-readable storage media 1206, and/or one or more other hardware logic unit(s) 1212 that perform operations using a fixed and/or programmable set of hardware logic gates. More generally stated, the hardware logic circuitry 1214 corresponds to one or more hardware logic units of any type(s) that perform operations based on logic stored in and/or otherwise embodied in the hardware logic unit(s).

In some cases (e.g., in the case in which the computing device 1202 represents a user computing device), the computing device 1202 also includes an input/output interface 1216 for receiving various inputs (via input devices 1218), and for providing various outputs (via output devices 1220). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1222 and an associated graphical user interface presentation (GUI) 1224. The display device 1222 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1202 can also include one or more network interfaces 1226 for exchanging data with other devices via one or more communication conduits 1228. One or more communication buses 1230 communicatively couple the above-described units together.

The communication conduit(s) 1228 can be implemented in any manner, e.g., by a local area computer network, a wide area computer network (e.g., the Internet), point-to-point connections, etc., or any combination thereof. The communication conduit(s) 1228 can include any combination of hardwired links, wireless links, routers, gateway functionality, name servers, etc., governed by any protocol or combination of protocols.

FIG. 12 shows the computing device 1202 as being composed of a discrete set of separate units. In some cases, the set of units may correspond to discrete hardware units provided in a computing device chassis having any form factor. FIG. 12 shows illustrative form factors in its bottom portion. In other cases, the computing device 1202 can include a hardware logic unit that integrates the functions of two or more of the units shown in FIG. 1. For instance, the computing device 1202 can include a system on a chip (SoC or SOC), corresponding to an integrated circuit that combines the functions of two or more of the units shown in FIG. 12.

The following summary provides a non-exhaustive set of illustrative aspects of the technology set forth herein.

According to a first example, one or more computing devices for processing network-accessible documents are described. The computing device(s) include hardware logic circuitry, which, in turn, includes: (a) one or more hardware processors that perform operations by executing machine-readable instructions stored in a memory, and/or (b) one or more other hardware logic units that perform the operations using a task-specific set of logic gates. The operations include: receiving a set of markup-language documents that originate from a repository of network-accessible documents, a number of documents in the set of markup-language documents being less that a total number of network-accessible documents in the repository; storing the set of markup-language documents in a sample data store; and producing a set of object-model representations for a plurality of markup-language documents in the set of markup-language documents. The operation of producing includes, for a given markup-language document, accessing information that is linked to the given markup-language document by at least one link, if any, specified in the given markup-language document. An object-model representation associated with the given markup-language document includes visual layout information that specifies a visual appearance of a page that is producible upon display of the given markup-language document by a browser application. The operations further include: storing the set of object-model representations in an object-representation data store; generating transformation logic based on the set of markup-language documents and the set of object-model representations, the transformation logic being configured to, when applied to new markup-language documents, convert the new markup-language documents into respective new object-model representations without retrieving at least some information identified by links in the new markup-language documents; and storing the transformation logic in a model data store.

According to a second example, the markup-language documents in the set of markup-language documents are HTML documents.

According to a third example, the set of markup-language documents pertains to a class of markup-language documents, and wherein the transformation logic is configured to process new documents that belong to the class of markup-language documents, and is not configured to process new documents that do not belong to the class of markup-language documents.

According to a fourth example, the operations further include performing the operations of receiving, producing, and generating for at least one additional class of markup-language documents, to overall produce plural instances of transformation logic associated with plural classes of markup-language documents.

According to a fifth example, the object-model representation of the given markup-language document includes a plurality of nodes arranged in a tree data structure.

According to a sixth example, the operation of generating the transformation logic includes generating a machine-trained model that, once trained, is configured to convert a new markup-language document into a corresponding new object-model representation.

According to a seventh example, relating to the sixth example, the operation of generating also produces heuristic logic that, when applied, is configured to modify visual layout information contained in the new object-model representation.

According to an eighth example, relating to the seventh example, the heuristic logic is configured to modify the visual layout information based on a quantity of content that is present in the new markup-language document.

According to a ninth example, the operations further include: receiving a new markup-language document; using the transformation logic to convert the new markup-language document into a corresponding new object-model representation without retrieving at least some information identified by at least one link, if any, contained in the new markup-language document; and storing the new object-model representation.

According to a tenth example, relating to the ninth example, the operations further include performing at least one post-processing operation based on the new object-model representation.

According to an eleventh example, relating to the tenth example, the at least one post-processing operation includes extracting data from the new markup-language document associated with the new object-model representation.

According to a twelfth example, a method is described for processing network-accessible documents. The method includes: receiving a new markup-language document from a repository of network-accessible markup-language documents; using transformation logic to convert the new markup-language document into a corresponding new object-model representation without retrieving at least some information identified by at least one link, if any, contained in the new markup-language document; and storing the new object-model representation. The transformation logic is produced, in advance of the operation of receiving, in a transformation-logic-generating process that includes: receiving a set of markup-language documents that originate from the repository of network-accessible documents, a number of documents in the set of markup-language documents being less that a total number of network-accessible documents in the repository; storing the set of markup-language documents in a sample data store; and producing a set of object-model representations for a plurality of markup-language documents in the set of markup-language documents. The operation of producing includes, for a given markup-language document, accessing information that is linked to the given markup-language document by at least one link, if any, specified in the given markup-language document. An object-model representation associated with the given markup-language document includes visual layout information that specifies a visual appearance of a page that is producible upon display of the given markup-language document by a browser application. The transformation-logic-generating process further includes: storing the set of object-model representations in an object-representation data store; generating the transformation logic based on the set of markup-language documents and the set of object-model representations, the transformation logic being configured to, when applied to new markup-language documents, convert the new markup-language documents into respective new object-model representations without retrieving at least some information identified by links in the new markup-language documents; and storing the transformation logic in a model data store.

According to a thirteenth example, relating to the twelfth example, the new markup-language document is an HTML document.

According to a fourteenth example, relating to the twelfth example, the set of markup-language documents pertains to a class of markup-language documents, and wherein the transformation logic is configured to process new documents that belong to the class of markup-language documents, and is not configured to process new documents that do not belong to the class of markup-language documents.

According to a fifteenth example, relating to the fourteenth example, the method further includes performing the operations of receiving a set of markup-language documents, producing, and generating for at least one additional class of markup-language documents, to overall produce plural instances of transformation logic associated with plural classes of markup-language documents.

According to a sixteenth aspect, relating to the twelfth aspect, the operation of generating the transformation logic includes generating a machine-trained model that, once trained, is configured to convert the new markup-language document into the corresponding new object-model representation.

According to a seventeenth example, relating to the sixteenth example, the operation of generating also produces heuristic logic that, when applied, is configured to modify visual layout information contained in the new object-model representation.

According to an eighteenth example, relating to the twelfth example, the operations further include performing at least one post-processing operation based on the new object-model representation.

According to a nineteenth example, relating to the eighteenth example, the at least one post-processing operation includes extracting data from the new markup-language document associated with the new object-model representation.

According to a twentieth example, a computer-readable storage medium for storing computer-readable instructions is described. The computer-readable instructions, when executed by one or more hardware processors, perform a method that includes a transformation-logic-generating process and a transformation-logic-applying process. The transformation-logic-generating process includes: receiving a set of markup-language documents that originate from a repository of network-accessible documents, a number of documents in the set of markup-language documents being less that a total number of network-accessible documents in the repository; storing the set of markup-language documents in a sample data store; and producing a set of object-model representations for a plurality of markup-language documents in the set of markup-language documents. The operation of producing includes, for a given markup-language document, accessing information that is linked to the given markup-language document by at least one link, if any, specified in the given markup-language document. An object-model representation associated with the given markup-language document includes visual layout information that specifies a visual appearance of a page that is producible upon display of the given markup-language document by a browser application. The transformation-logic-generating process further includes: storing the set of object-model representations in an object-representation data store; generating transformation logic based on the set of markup-language documents and the set of object-model representations, the transformation logic being configured to, when applied to new markup-language documents, convert the new markup-language documents into respective object-model representations without retrieving at least some information identified by links in the new markup-language documents; and storing the transformation logic in a model data store. The transformation-logic-application process includes: receiving a new markup-language document; using the transformation logic to convert the new markup-language document into a corresponding new object-model representation without retrieving at least some information identified by at least one link, if any, contained in the new markup-language document; and storing the new object-model representation.

A twenty-first example corresponds to any combination (e.g., any logically consistent permutation or subset) of the above-referenced first through twentieth examples.

A twenty-second example corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first examples.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for processing network-accessible documents, comprising:
   hardware logic circuitry, the hardware logic circuitry including: (a) one or more hardware processors that perform operations by executing machine-readable instructions stored in a memory, and/or (b) one or more other hardware logic units that perform the operations using a task-specific set of logic gates, the operations including:
   receiving a set of markup-language documents that originate from a repository of the network-accessible documents, a number of documents in the set of markup-language documents being less that a total number of network-accessible documents in the repository;
   storing the set of markup-language documents in a sample data store;
   producing a set of object-model representations for a plurality of markup-language documents in the set of markup-language documents,
   said producing including, for a given markup-language document, accessing information that is linked to the given markup-language document by at least one link, if any, specified in the given markup-language document,
   an object-model representation associated with the given markup-language document including visual layout information that specifies a visual appearance of a page that is producible upon display of the given markup-language document by a browser application;
   storing the set of object-model representations in an object-representation data store;
   generating transformation logic based on the set of markup-language documents and the set of object-model representations, the transformation logic being configured to, when applied to new markup-language documents, convert the new markup-language documents into respective new object-model representations without retrieving at least some information identified by links in the new markup-language documents; and
   storing the transformation logic in a model data store.

2. The one or more computing devices of claim 1, wherein the markup-language documents in the set of markup-language documents are HTML documents.

3. The one or more computing devices of claim 1, wherein the set of markup-language documents pertains to a class of markup-language documents, and wherein the transformation logic is configured to process new documents that belong to the class of markup-language documents, and is not configured to process new documents that do not belong to the class of markup-language documents.

4. The one or more computing devices of claim 3, wherein the operations further include performing said receiving, producing, and generating for at least one additional class of markup-language documents, to overall produce plural instances of transformation logic associated with plural classes of markup-language documents.

5. The one or more computing devices of claim 1, wherein the object-model representation of the given markup-language document includes a plurality of nodes arranged in a tree data structure.

6. The one or more computing devices of claim 1, wherein said generating the transformation logic includes generating a machine-trained model that, once trained, is configured to convert a new markup-language document into a corresponding new object-model representation.

7. The one or more computing devices of claim 6, wherein said generating also produces heuristic logic that, when applied, is configured to modify visual layout information contained in the new object-model representation.

8. The one or more computing devices of claim 7, wherein the heuristic logic is configured to modify the visual layout information based on a quantity of content that is present in the new markup-language document.

9. The one or more computing devices of claim 1, wherein the operations further include:
   receiving a new markup-language document;
   using the transformation logic to convert the new markup-language document into a corresponding new object-model representation without retrieving at least some information identified by at least one link, if any, contained in the new markup-language document; and
   storing the new object-model representation.

10. The one or more computing devices of claim 9, wherein the operations further include performing at least one post-processing operation based on the new object-model representation.

11. The one or more computing devices of claim 10, wherein said at least one post-processing operation includes extracting data from the new markup-language document associated with the new object-model representation.

12. A method for processing network-accessible documents, comprising:
   receiving a new markup-language document from a repository of the network-accessible documents;
   using transformation logic to convert the new markup-language document into a corresponding new object-model representation without retrieving at least some information identified by at least one link, if any, contained in the new markup-language document; and
   storing the new object-model representation,
   the transformation logic being produced, in advance of said receiving, in a transformation-logic-generating process that includes:
      receiving a set of markup-language documents that originate from the repository of network-accessible documents, a number of documents in the set of markup-language documents being less that a total number of network-accessible documents in the repository;
      storing the set of markup-language documents in a sample data store;
      producing a set of object-model representations for a plurality of markup-language documents in the set of markup-language documents, said producing including, for a given markup-language document, accessing information that is linked to the given markup-language document by at least one link, if any, specified in the given markup-language document, an object-model representation associated with the given markup-language document including visual layout information that specifies a visual appearance of a page that is producible upon display of the given markup-language document by a browser application;
      storing the set of object-model representations in an object-representation data store;
      generating the transformation logic based on the set of markup-language documents and the set of object-model representations, the transformation logic being configured to, when applied to new markup-language documents, convert the new markup-language documents into respective new object-model representations without retrieving at least some information identified by links in the new markup-language documents; and
      storing the transformation logic in a model data store.

13. The method of claim 12, wherein the new markup-language document is an HTML document.

14. The method of claim 12, wherein the set of markup-language documents pertains to a class of markup-language documents, and wherein the transformation logic is configured to process new documents that belong to the class of markup-language documents, and is not configured to process new documents that do not belong to the class of markup-language documents.

15. The method of claim 14, wherein the method further includes performing said receiving a set of markup-language documents, producing, and generating for at least one additional class of markup-language documents, to overall produce plural instances of transformation logic associated with plural classes of markup-language documents.

16. The method of claim 12, wherein said generating the transformation logic includes generating a machine-trained model that, once trained, is configured to convert the new markup-language document into the corresponding new object-model representation.

17. The method of claim 16, wherein said generating also produces heuristic logic that, when applied, is configured to modify visual layout information contained in the new object-model representation.

18. The method of claim 12, wherein the method further includes performing at least one post-processing operation based on the new object-model representation.

19. The method of claim 18, wherein said at least one post-processing operation includes extracting data from the new markup-language document associated with the new object-model representation.

20. A computer-readable storage medium for storing computer-readable instructions, the computer-readable instructions, when executed by one or more hardware processors, performing a method that comprises:
   in a transformation-logic-generating process:
      receiving a set of markup-language documents that originate from a repository of network-accessible documents, a number of documents in the set of markup-language documents being less that a total number of network-accessible documents in the repository;
      storing the set of markup-language documents in a sample data store;
      producing a set of object-model representations for a plurality of markup-language documents in the set of markup-language documents, said producing including, for a given markup-language document, accessing information that is linked to the given markup-language document by at least one link, if any, specified in the given markup-language document, an object-model representation associated with the given markup-language document including visual layout information that specifies a visual appearance of a page that is producible upon display of the given markup-language document by a browser application;
      storing the set of object-model representations in an object-representation data store;

generating transformation logic based on the set of markup-language documents and the set of object-model representations, the transformation logic being configured to, when applied to new markup-language documents, convert the new markup-language documents into respective object-model representations without retrieving at least some information identified by links in the new markup-language documents; and storing the transformation logic in a model data store; and in a transformation-logic-application process:

receiving a new markup-language document;

using the transformation logic to convert the new markup-language document into a corresponding new object-model representation without retrieving at least some information identified by at least one link, if any, contained in the new markup-language document; and storing the new object-model representation.

\* \* \* \* \*